United States Patent
Schurig et al.

(10) Patent No.: US 9,945,163 B2
(45) Date of Patent: Apr. 17, 2018

(54) VEHICLE DOOR HANDLE APPARATUS AND TWO-SHOT INJECTION MOLDING PROCESS FOR PRODUCING COMPONENTS WITH A METALLIC SURFACE FINISH

(71) Applicants: Steven J Schurig, Flint, MI (US); Stephen J Eynon, Lake Orion, MI (US); Danillo F Tesolin, Windsor (CA)

(72) Inventors: Steven J Schurig, Flint, MI (US); Stephen J Eynon, Lake Orion, MI (US); Danillo F Tesolin, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 385 days.

(21) Appl. No.: 14/724,190

(22) Filed: May 28, 2015

(65) Prior Publication Data
US 2016/0348410 A1    Dec. 1, 2016

(51) Int. Cl.
*B29C 45/16* (2006.01)
*E05B 85/16* (2014.01)
(Continued)

(52) U.S. Cl.
CPC .......... *E05B 85/16* (2013.01); *B29C 45/0003* (2013.01); *B29C 45/0013* (2013.01); *B29C 45/1679* (2013.01); *E05B 17/0004* (2013.01); *E05B 85/12* (2013.01); *B29C 2045/1692* (2013.01); *B29K 2059/00* (2013.01);
(Continued)

(58) Field of Classification Search
CPC ........ B29C 45/0003; B29C 2045/1692; B29C 45/0013
See application file for complete search history.

(56) References Cited

U.S. PATENT DOCUMENTS

| 6,068,896 | A | 5/2000 | Manabe et al. |
| 7,544,319 | B2 | 6/2009 | March et al. |

(Continued)

FOREIGN PATENT DOCUMENTS

| CA | 2047625 A1 | 1/1992 |
| DE | 10001009 A1 | 7/2001 |
| JP | S54160466 A | 12/1979 |

OTHER PUBLICATIONS

International Search Report and Written Opinion dated Aug. 24, 2016 for International Application No. PCT/US2016/029359, International Filing Date Apr. 26, 2016.

*Primary Examiner* — Jill L Heitbrink
(74) *Attorney, Agent, or Firm* — Ralph E Smith

(57) ABSTRACT

A vehicle door handle apparatus is disclosed that generally includes a structural core and an outer layer. The structural core has an outer surface, a base portion, and a handle portion that extends from the base portion. The outer layer extends about and covers the outer surface of at least the handle portion of the structural core. The structural core is made of a first material that contains an engineering thermoplastic and glass fibers for reinforcement. The outer layer is made of a second material that contains the engineering thermoplastic and a milled material to give the outer layer a metallic surface finish. Non-limiting examples of the engineering thermoplastic are polyoxymethylene and polybutylene terephthalate. A method is also disclosed for producing an injection molded component having a metallic surface finish such as the disclosed vehicle door handle apparatus.

11 Claims, 4 Drawing Sheets

(51) Int. Cl.
    *B29C 45/00*     (2006.01)
    *E05B 85/12*     (2014.01)
    *E05B 17/00*     (2006.01)
    *B29K 59/00*     (2006.01)
    *B29K 309/08*     (2006.01)
    *B29K 505/02*     (2006.01)
    *B29K 67/00*     (2006.01)

(52) U.S. Cl.
    CPC .... *B29K 2067/006* (2013.01); *B29K 2309/08* (2013.01); *B29K 2505/02* (2013.01)

(56) References Cited

U.S. PATENT DOCUMENTS

2006/0118999 A1\*   6/2006   Cooper ............... B29C 37/0028
                                                  264/255
2016/0207237 A1\*   7/2016   Radtke .............. B29C 45/14786

\* cited by examiner

VEHICLE DOOR HANDLE APPARATUS AND TWO-SHOT INJECTION MOLDING PROCESS FOR PRODUCING COMPONENTS WITH A METALLIC SURFACE FINISH

FIELD

The subject disclosure relates to injection molded components that have a metallic surface finish such as vehicle door handles and to methods for producing the same.

BACKGROUND

This section provides background information related to the present disclosure which is not necessarily prior art.

Injection molded components are widely used in the automotive industry for various trim pieces and other parts that are installed both inside and outside a vehicle. Such injection molded components are typically made of a thermoplastic material. Typically, injection molded components are lighter and cheaper to make in comparison to metal parts, particularly when the part requires complex shapes and curves. Injection molded components also tend to be more corrosion resistant than metal parts, which are prone to rust. However, consumers typically associate injection molded components with inferior quality largely due to their weight and appearance. Accordingly, there has been a trend within the automotive industry in recent years to improve the quality of injection molded components, including making improvements to the appearance of these components. This is especially true within luxury brands and vehicles with upgraded trim packages. These advances have led to the proliferation of injection molded components that simulate (i.e. have the appearance of) metal parts.

One area where improvements in injection molded components are notable is in vehicle door handles on both the inside and outside of the vehicle. At one time, vehicle door handles were commonly made of metal. Due to cost reduction efforts, most vehicle door handles are now made of plastic using injection molding processes. While this change gives automakers more options regarding the shape of the door handle, standard injection molded components have a dull surface finish and are often perceived by consumers as having a "cheap" appearance. One way that automakers have "dressed-up" the appearance of these injection molded components is by chrome plating vehicle door handles. Examples of chrome-plated vehicle door handles are found in U.S. Pat. No. 7,544,319 entitled "Vehicle Handle Assembly With Antenna," which issued to March et al. on Jun. 9, 2009 and Canadian Patent Application No. 2,047,625 entitled "Injection Molding Process For Platable Plastic Substrates," which was published on Jan. 25, 1992 naming Robert L. Coombes, Jr. as the inventor. Both of these references teach vehicle door handles that are manufactured using a conventional two-shot injection molding process. The vehicle door handles have two plastic layers, an inner layer that is formed by the first shot and an outer layer that is formed by the second shot. Both references explicitly call for the outer layer to be made of a platable plastic material. In other words, the plastic material forming the outer layer is selected from a group of plastics that are compatible with the chrome plating process (i.e. plastics that chrome can adhere to). Chrome plating is applied to the platable plastic material to create a vehicle door handle that ultimately includes three layers—two plastic layers and one layer of chrome plate. As explained in the references, the chrome plating can be applied by immersing at least part of the vehicle door handle in one or more electroplating baths, where metal is electrolytically deposited on the surface of the outer layer. This is a fairly lengthy and expensive manufacturing process because the vehicle door handle is not a finished component when it is removed from the mold. Also, the chemicals used in the chrome plating process are hazardous to the environment and can create adverse health effects when exposed to humans. Therefore, caution must be used in the handling and disposal of these chemicals.

Although the chrome plated vehicle door handles produced by this process have a metallic appearance and are thus more aesthetically pleasing than un-plated injection molded door handles, they suffer from a number of problems in addition to the time, expense, and environmental drawbacks that are associated with the chrome plating process. First, the metal that is deposited on the outer layer of the vehicle door handle is susceptible to corrosion. As such, the chrome plating itself may rust even if the plastic material forming the inner and outer layers cannot. Second, the chrome plating can bubble, peel, and chip. This not only detracts from the appearance of the vehicle door handle, but the exposed edges of the chrome plating tend to be sharp and can cut a person's hand when they grab the vehicle door handle during ingress or egress. What is needed is an alternative solution to chrome plating that produces a plastic vehicle door handle with a metallic surface finish at a reasonable cost.

SUMMARY

This section provides a general summary of the disclosure and is not a comprehensive disclosure of its full scope or all of its features.

In accordance with one aspect of the subject disclosure, a vehicle door handle apparatus is provided. The vehicle door handle apparatus generally includes a structural core and an outer layer. The structural core has a base portion with at least one mounting feature and a handle portion that extends from the base portion. The structural core also has an outer surface that extends along both the base portion and the handle portion. The outer layer of the vehicle handle apparatus extends about and covers the outer surface of at least the handle portion of the structural core. The structural core is made of a first material that contains an engineering thermoplastic and glass fibers for reinforcement. The outer layer is made of a second material that contains the engineering thermoplastic and a milled material to give the outer layer a metallic surface finish.

In accordance with another aspect of the subject disclosure, a method for producing an injection molded component having a metallic surface finish is provided. The method includes the step of heating a first material containing an engineering thermoplastic and glass fibers for reinforcement to a first temperature. The first temperature is above a melting point of the first material. The method also includes the step of injecting a first shot of the first material into a mold cavity at a first volumetric flowrate. The mold cavity defines a volume of the injection molded component. In accordance with the step of injecting the first shot, the first volumetric flowrate ranges from 33 percent of the volume of the injection molded component per second to 100 percent of the volume of the injection molded component per second. The method includes the step of holding a surface of the mold cavity at a second temperature. The second temperature is below the melting point of the first material. This step cools the first material that was injected into the mold cavity, which forms a structural core of the injection molded component.

The method also includes the step of heating a second material containing the engineering thermoplastic and a milled material to a third temperature. The third temperature is above a melting point of the second material and is less than the first temperature. The method further includes the step of injecting a second shot of the second material into the mold cavity between the surface of the mold cavity and the structural core at a second volumetric flowrate. The second volumetric flowrate is less than the first volumetric flowrate. In other words, the process calls for injecting the second shot into the mold cavity at a slower rate compared to the rate at which the first shot is injected into the mold cavity. This is done in order to avoid metameric failure in the second material, which is caused by disrupting the distribution and orientation of the milled material that is contained within the second material. In accordance with the step of injecting the second shot, the second volumetric flowrate ranges from 5 percent of the volume of the injection molded component per second to 25 percent of the volume of the injection molded component per second. The method also includes the step of holding the surface of the mold cavity at a fourth temperature. The fourth temperature is less than a melting point of the second material. In this step, the second material that is injected into the mold cavity fuses with the first material of the structural core and forms an outer layer around the structural core. Accordingly, the outer layer that is produced by this method is made of the second material and has a uniform metallic surface finish that is provided by the milled material. The method additionally includes the step of removing the injection molded component, which comprises the structural core and the outer layer, from the mold cavity.

Advantageously, the disclosed vehicle door handle apparatus is lighter, cheaper, stronger, and less prone to buzz, squeak, and rattle (BSR) when compared to chrome plated vehicle door handles. Consumers are also benefited because there is no chrome plating to rust, bubble, peel and chip. The disclosed vehicle door handle and the process for its manufacture thus provide a solution to the problem of chipped chrome plated handles cutting the hands of consumers. The disclosed method for manufacturing injection molded components, such as the disclosed vehicle door handle apparatus, also allows for a composite injection molded component to be created with an outer layer that has a uniform, high luster, metallic surface finish right out of the mold. Other two-shot injection molding processes are incapable of providing the same quality of metallic surface finish and the disclosed method eliminates the need for a subsequent chrome plating process. This simplifies the manufacturing process, reduces cost, and has environmental benefits over chrome plating.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
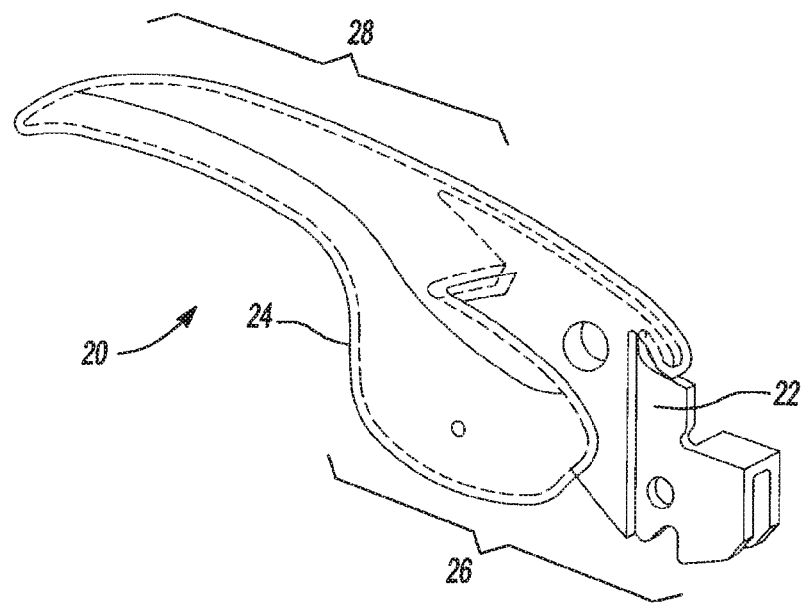
FIG. 1 is a front perspective view of an exemplary vehicle door handle apparatus constructed in accordance with the subject invention, which includes a structure core and an outer layer.

Referring to the Figures, wherein like numerals indicate corresponding parts throughout the several views, a vehicle door handle apparatus 20 is disclosed along with a two-shot injection molding process. The two-shot injection molding process involves a method for producing an injection molded component having a metallic surface finish. The injection molded component that is produced by this process may be, for example, the vehicle door handle apparatus 20.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
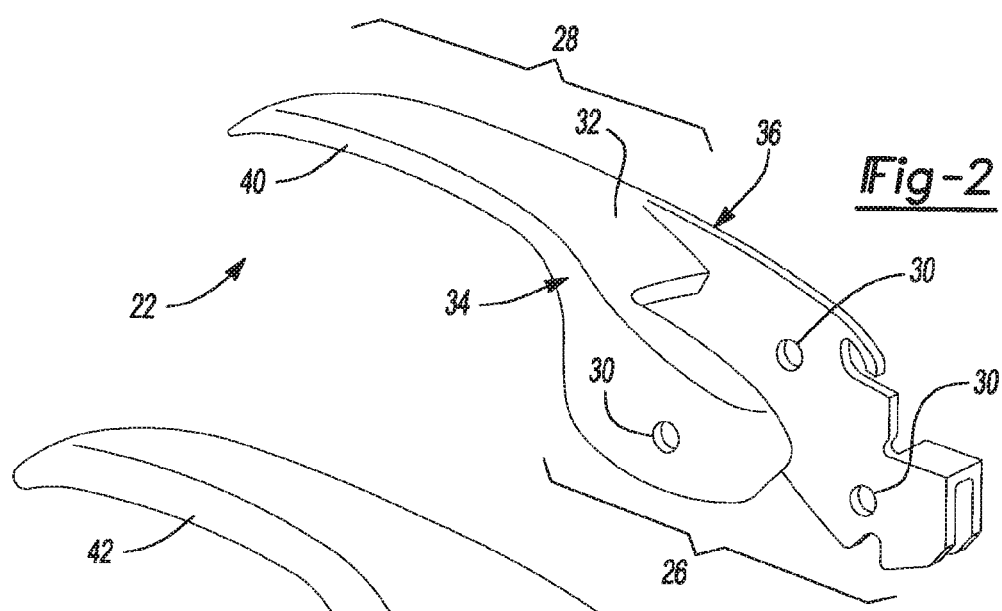
FIG. 2 is a front perspective view of the structural core of the exemplary vehicle door handle apparatus illustrated in FIG. 1.
Figure 3:
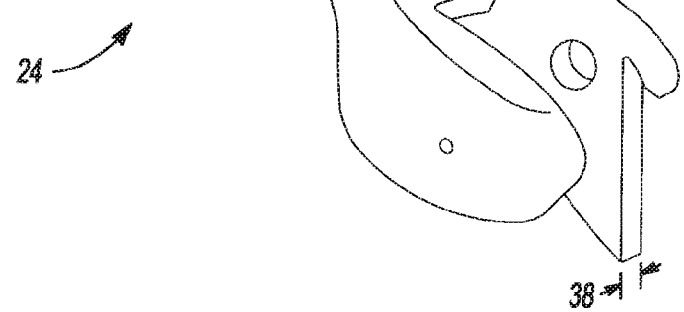
FIG. 3 is a front perspective view of the outer layer of the exemplary vehicle door handle apparatus illustrates in FIG. 1.

With reference to FIGS. 1-3, the vehicle door handle apparatus 20 is shown in various stages of completion. FIG. 1 illustrates the vehicle door handle apparatus 20 in a final stage of completion, where the vehicle door handle apparatus 20 is ready to be installed in or on a vehicle door (not shown). The vehicle door handle apparatus 20 generally includes a structural core 22 and an outer layer 24. Although the vehicle door handle apparatus 20 that is illustrated in the figures is designed for installation on an interior side of the vehicle door (i.e. the side of the vehicle door that faces the passenger compartment of the vehicle), it should be appreciated that the subject disclosure also encompasses configurations of the vehicle door handle apparatus 20 that are designed for installation on an exterior side of the vehicle door (i.e. the side of the vehicle door that is exposed to the outside environment). The vehicle door handle apparatus 20 disclosed herein is generally used for opening and/or closing the vehicle door. FIG. 2 illustrates only the structural core 22 of the vehicle door handle apparatus 20. The structural core 22 has a base portion 26 and a handle portion 28. The base portion 26 of the structural core 22 generally includes one or more mounting features 30. By way of example and without limitation, the mounting features 30 may be holes or bores that extend through the base portion 26 of the structural core 22. When the vehicle door handle apparatus 20 is installed, bolts or other fasteners (not shown) may extend through the mounting features 30 to couple the vehicle door handle apparatus 20 to the vehicle door and/or to one or more linkages that effectuate the release of a vehicle door latch mechanism (not shown).

The handle portion 28 of the structural core 22 generally extends from the base portion 26. The handle portion 28 of the structural core 22 may extend in one or more directions outwardly from the base portion 26 such that the handle portion 28 may be straight or curved. The handle portion 28 is thus configured to be grasped by a person's hand or portions thereof (such as one or more fingers) and be pushed, pulled, slid, or rotated to effectuate the release of the vehicle door latch mechanism, Accordingly, the distance that the handle portion 28 extends should be selected with these ergonomic requirements in mind. The structural core 22 has an outer surface 32 that extends along both the base portion 26 and the handle portion 28. The outer surface 32 generally includes a front face 34 and a rear face 36. The rear face 36 is oppositely directed with respect to the front face 34. Where the vehicle door handle apparatus 20 is installed on the interior side of the vehicle door, the front face 34 generally faces the passenger compartment of the vehicle and the rear face 36 generally faces the interior side of the vehicle door. Where the vehicle door handle apparatus 20 is installed on the exterior side of the vehicle door, the front face 34 generally faces the outside environment (i.e. away from the vehicle) and the rear face 36 generally faces the exterior side of the vehicle door.

As shown in FIG. 1, the outer layer 24 of the vehicle door handle apparatus 20 generally extends about and covers the outer surface 32 of at least the handle portion 28 of the structural core 22. As such, it should be appreciated that the outer layer 24 covers both the front and rear faces 34, 36 of the outer surface 32 at or along the handle portion 28. FIG. 3 shows the outer layer 24 of the vehicle door handle apparatus 20 in isolation from the structural core 22 for illustration purposes, although it should be appreciated that the outer layer 24 may be fused with the structural layer such that removal of the outer layer 24 from the structural core 22 may not in fact be feasible. From FIGS. 1-3, it should be appreciated that the outer layer 24 extends continuously about at least the handle portion 28 of the structural core 22 and is relatively thin in comparison to the structural core 22. In accordance with one aspect of the subject disclosure, the outer layer 24 may have a nominal thickness 38 (i.e. average thickness) ranging from 0.5 millimeters (mm) to 3.0 millimeters (mm).

The structural core 22 of the vehicle door handle apparatus 20 is made of a first material 40 that contains an engineering thermoplastic and glass fibers for reinforcement. It should be appreciated that the term "engineering thermoplastic" is an industry recognized term that refers to a group of plastic materials that have better mechanical properties, thermal properties, chemical resistance, and/or ultra-violet resistance than more widely used commodity plastics. By way of non-limiting example, engineering thermoplastics include: acrylonitrile butadiene styrene (ABS), polycaprolactam (Nylon 6), polyamides (PA), polybutylene terephthalate (PBT), polycarbonates (PC), polyetheretherketone (PEEK), polyetherketone (PEK), polyethylene terephthalate (PET), polyimides, polyoxymethylene plastic (POM), polyphenylene sulfide (PPS), polyphenylene oxide (PPO), polysulphone (PSU), and ultra-high molecular weight polyethylene (UHMWPE). In accordance with one aspect of the subject disclosure, the first material 40 (i.e. the material used for the structural core 22) is a glass reinforced polyoxymethylene (POM). This engineering thermoplastic has been found to be particularly suitable where the vehicle door handle apparatus 20 is intended to be installed on the interior side of the vehicle door. In accordance with another aspect of the subject disclosure, the first material 40 (i.e. the material used for the structural core 22) is a glass reinforced polybutylene terephthalate (PBT). This engineering thermoplastic has been found to be particularly suitable where the vehicle door handle apparatus 20 is intended to be installed on the exterior side of the vehicle door. The first material 40 gives the outer surface 32 of the structural core 22 a dull surface finish, meaning that the outer surface 32 of the structural core 22 is not highly reflective (i.e. is not shiny). Accordingly, the outer surface 32 of the structural core 22 is not particularly attractive. The glass fibers contained within the first material 40 provide structural reinforcement in when the vehicle door handle apparatus 20 is in the final stage of completion. As will be explained in greater detail below, the glass fibers also reinforce the structural core 22 when the outer layer 24 is being created by the disclosed two-shot injection molding process. In accordance with the method described below, the outer layer 24 is over-molded onto the structural core 22. The glass fibers in the first material 40 help the structural core 22 resist deflection when the outer layer 24 is injected over and fused to the outer surface 32 of the structural core 22 at the required (atypically high) temperatures.

Figure 4:
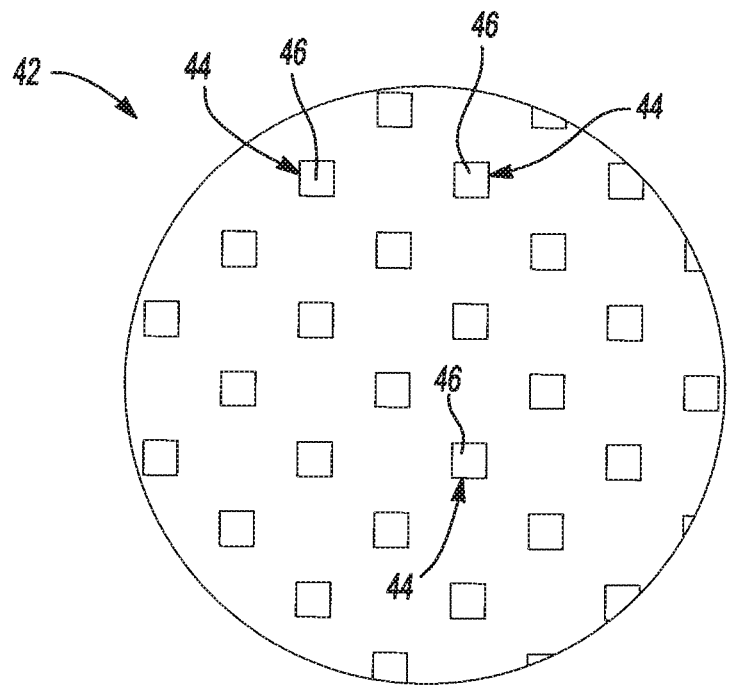
FIG. 4 is an enlarged view of the outer layer of the exemplary vehicle door handle apparatus where the outer layer is shown having a uniform metallic surface finish that is free of metameric failures and other defects.
Figure 5:
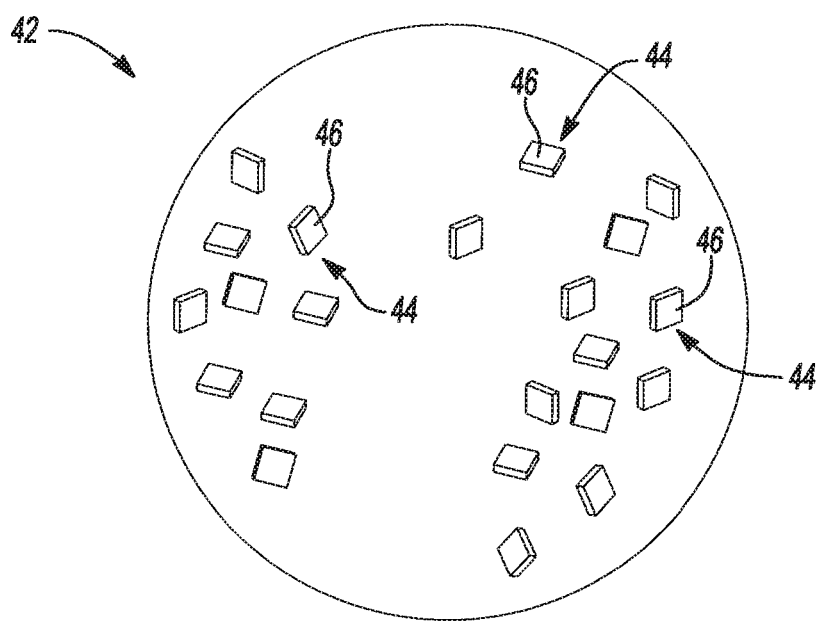
FIG. 5 is another enlarged view of the outer layer of the exemplary vehicle door handle apparatus where the outer layer is shown with metameric failures and flow line defects.

The outer layer 24 of the vehicle door handle apparatus 20 is made of a second material 42 that contains the same engineering thermoplastic used in the first material 40 in addition to a milled material that gives the outer layer 24 a metallic surface finish. Accordingly, it should be appreciated that the second material 42 does not contain glass fibers and is pigmented by the milled material. In accordance with the exemplary configurations described above, the second material 42 may be a pigmented polyoxymethylene (POM) when the vehicle door handle apparatus 20 is intended to be installed on the interior side of the vehicle door and the second material 42 may be a pigmented polybutylene terephthalate (PBT) when the vehicle door handle apparatus 20 is intended to be installed on the exterior side of the vehicle door. With reference to FIGS. 4 and 5, the milled material comprises micro-flakes 44 that reflect a large amount of light. In accordance with one aspect of the subject disclosure, the milled material is aluminum micro-flake and/or mica micro-flake. Each micro-flake 44 of the milled material has a defined geometric shape that may include multiple, substantial planar surfaces 46 that reflect light. Accordingly, the orientation of the micro-flakes 44 within the outer layer 24 influences the shininess and metamerism of the metallic surface finish. Generally, the metallic surface finish will reflect more light (i.e. is more shiny) when a large number of the micro-flakes 44 have planar surfaces 46 that are aligned with (i.e. substantially parallel to) the outer surface 32 of the structural core 22 (as shown in FIG. 4). The metamerism of the metallic surface finish (i.e. the uniformity of color matching) and thus the perceived quality of the metallic surface finish is high when a large number of the micro-flakes 44 have planar surfaces 46 with similar orientations and when the micro-flakes 44 of the milled material are evenly distributed throughout the outer layer 24 of the vehicle door handle apparatus 20 (as shown in FIG. 4). Conversely, the metallic surface finish of the outer layer 24 may appear cloudy when a large number of the micro-flakes 44 have planar surfaces 46 that are not aligned with (i.e. are oblique relative to) one another and the outer surface 32 of the structural core 22 (as shown in FIG. 5). Flow lines, color changes, and other defects may also be visible in the metallic surface finish of the outer layer 24 when the micro-flakes 44 in the second material 42 are not evenly distributed across the outer layer 24 (as shown in FIG. 5).

Figure 6:
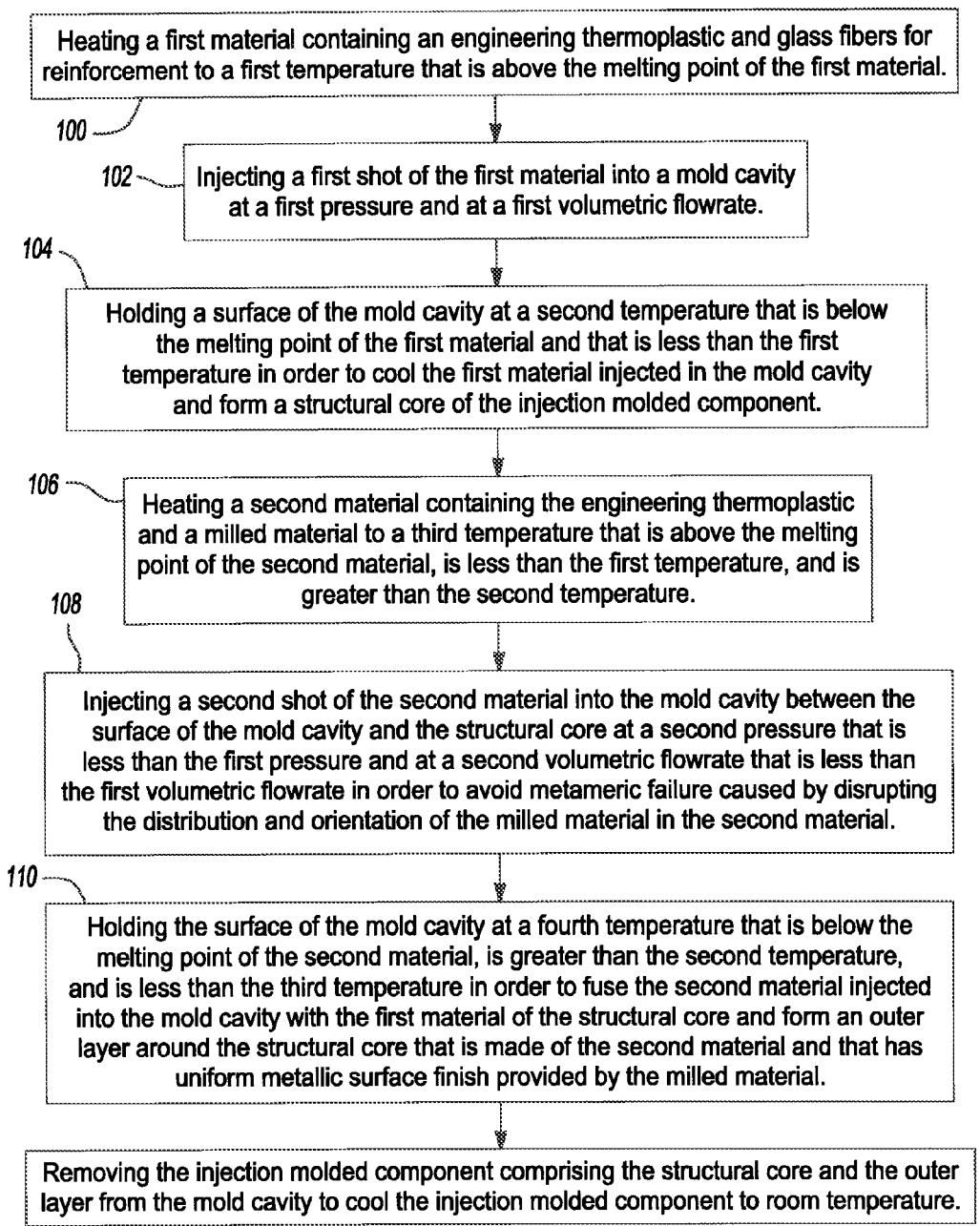
FIG. 6 is a flowchart illustrating the steps of the disclosed method for producing an injection molded component having a metallic surface finish.
Figure 7:
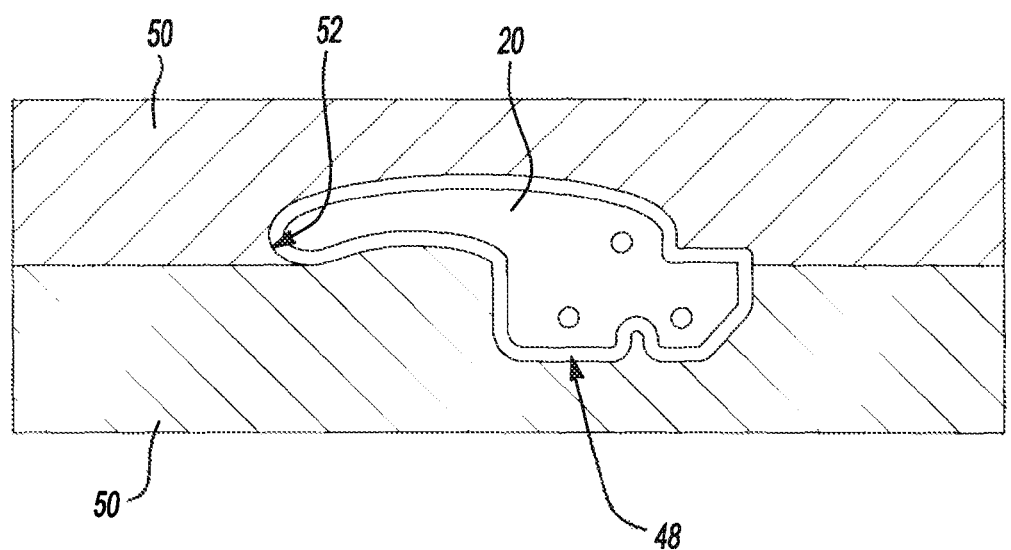
FIG. 7 is a side cross-sectional view of an exemplary mold that is configured to carry out the disclosed method.

The subject disclosure also includes a method for producing an injection molded component having a metallic surface finish, such as the vehicle door hand apparatus described above. With reference to FIG. 6, the method comprises a number of steps illustrated by blocks 100 to 112. The method includes the step illustrated by block 100 of heating the first material 40 to a first temperature that is above a melting point of the first material 40. In accordance with this step, the first material 40 contains the engineering thermoplastic and glass fibers described above. In the example where the first material 40 is a glass reinforced polyoxymethylene (POM), the first temperature may be approximately 400 degrees Fahrenheit (F). The method includes the step illustrate by block 102 of injecting a first shot of the first material 40 into a mold cavity 48 at a first pressure and at a first volumetric flowrate. As shown in FIG. 7, the process disclosed herein is carried out using a mold 50. The mold cavity 48 is disposed within the mold 50 and defines a volume of the injection molded component, which corresponds with the volume of the vehicle door handle apparatus 20 in the example provided herein. The mold cavity 48 has a surface 52 that is temperature controlled. In accordance with this step, the first volumetric flowrate ranges from 33 percent of the volume of the injection molded component per second to 100 percent of the volume of the injection molded component per second. In the example where the first material 40 is a glass reinforced polyoxymethylene (POM), the first pressure may range from 8,000 pounds per square inch (psi) to 14,000 pounds per square inch (psi). The method also includes the step illustrated by block 104 of holding the surface 52 of the mold cavity 48 at a second temperature. The second temperature is below the melting point of the first material 40 and is less than the first temperature. This is done in order to cool the first material 40 that has been injected into the mold cavity 48. During this step, the structural core 22 of the injection molded component is formed within the mold cavity 48. In the example where the first material 40 is a glass reinforced polyoxymethylene (POM), the second temperature may range from 55 degrees Fahrenheit (F) to 180 degrees Fahrenheit (F).

The method further includes the step illustrated by block 106 of heating the second material 42 to a third temperature. The third temperature is above a melting point of the second material 42, is less than the first temperature, and is greater than the second temperature. The second material 42 contains the engineering thermoplastic and milled material described above. In the example where the second material 42 is a pigmented polyoxymethylene (POM), the third temperature may be approximately 375 degrees Fahrenheit (F). The method includes the step illustrated by block 108 of injecting a second shot of the second material 42 into the mold cavity 48 between the surface 52 of the mold cavity 48 and the structural core 22 at a second pressure and a second volumetric flowrate. The second pressure is less than the first pressure and the second volumetric flowrate is less than the first volumetric flowrate. Specifically, the second volumetric flowrate ranges from 5 percent of the volume of the injection molded component per second to 25 percent of the volume of the injection molded component per second. In the example where the second material 42 is a pigmented polyoxymethylene (POM), the second pressure may range from 3,500 pounds per square inch (psi) to 6,500 pounds per square inch (psi). As a result, the second material 42 is injected into the mold cavity 48 more slowly than the first material 40 in order to reduce turbulence in the second shot and thus avoid metameric failure in the second material 42, which ultimately forms the outer layer 24 of the injection molded component. Due to these parameters, the outer layer 24 of the injection molded component has a uniform, metallic surface finish with high luster (as shown in FIG. 4) that is free of flow lines and other defects. In other words, the metallic surface finish that is provided is comparable in appearance to that achieved using a chrome plating process. Conversely, metameric failure is caused if the distribution and orientation of the milled material in the second material 42 is disrupted or disturbed by turbulence during the injecting step illustrated by block 108. In other words, turbulence in the second shot can cause the micro-flakes 44 of the milled material to: (1) bunch together and form flow lines in the second material 42, and/or (2) change their orientation (i.e. flip and flop) such that the planar surfaces 46 of the micro-flakes 44 are reoriented and are not aligned with one another and the outer surface 32 of the structural core 22. FIG. 5 illustrates an example where the metallic surface finish of the outer layer 24 of the injection molded component is cloudy and has flow line defects because the orientation and distribution of the micro-flakes 44 in the milled material was disrupted when the second shot was injected into the mold cavity 48.

Referring again to FIG. 6, the method includes the step illustrated by block 110 of holding the surface 52 of the mold cavity 48 at a fourth temperature. The fourth temperature is below the melting point of the second material 42, is greater than the second temperature, and is less than the third temperature. In accordance with this step, the second material 42 that has been injected into the mold cavity 48 fuses with the first material 40 of the structural core 22 to form the outer layer 24 around the structural core 22. Because the second shot of the second material 42 is injected at an atypically slow rate and at an atypically low pressure in the step illustrated by block 108 in order to preserve the orientation and distribution of the micro-flakes 44 of the milled material, a much higher mold surface temperature must be used to achieve proper melt flow and ensure that the second material 42 of the outer layer 24 fuses with the first material 40 of the structural core 22. In the example where the second material 42 is a pigmented polyoxymethylene (POM), the third temperature may range from 220 degrees Fahrenheit (F) to 280 degrees Fahrenheit (F). More particularly, the third temperature may be approximately 245 degrees Fahrenheit (F). It should also be appreciated that the glass fibers in the first material 40 help keep the structural core 22 of the injection molded component from deflecting as the second shot flows around and fuses to the structural core 22 at these atypically high mold temperatures. In the absence of the glass fibers, the nominal thickness 38 of the outer layer 24 would be difficult to control and would vary considerably across the outer surface 32 of the structural core 22. Such deflection and variance in the nominal thickness 38 could also promote metameric failure in the metallic surface finish of the outer layer 24.

The method continues with the step illustrated by block 112 of removing the injection molded component from the mold cavity 46 to cool the injection molded component further. In accordance with this step, the injection molded component may be allowed to cool to room temperature, for example. It should be appreciated that by the time this step is performed, the injection molded component includes both the structural core 22 and the outer layer 24 and thus may be in its final stage of completion. The injecting steps of the method illustrated by blocks 102 and 108 may be configured to give the outer layer 24 of the injection molded component a desired thickness. For example, the volume of the first material 40 that is injected into the mold cavity 48 may be is less than the volume of the mold cavity 48 by a predetermined value such that the volume difference created by the predetermined value produces a space between the surface of the mold cavity 48 and outer surface 32 of the structural core 22. The second material 42 flows into and occupies this space when the outer layer 24 is formed. By controlling the volume difference between the volume of the first material 40 that is injected into the mold cavity 48 and the volume of the mold cavity 48, the nominal thickness 38 of the outer layer 24 can be controlled. In accordance with the examples described herein, the nominal thickness 38 of the outer layer 24 may be selected to range from 0.5 millimeters (mm) to 3.0 millimeters (mm).

Although the various temperatures and pressures disclosed herein in connection with the process for manufacturing the injection molded component relate to the example where the first material 40 is a glass reinforced polyoxymethylene (POM) and the second material 42 is a pigmented polyoxymethylene (POM) that does not contain glass fibers, the process is not limited to such materials. It should be understood that the process may be adapted for use with other engineering thermoplastic such as where the first material 40 is a glass reinforced polybutylene terephthalate (PBT) and the second material 42 is a pigmented polybutylene terephthalate (PBT) that does not contain glass fibers, for example. Similarly, the milled material may be aluminum micro-flake, mica micro-flake, or other suitable alternatives. With regard to the temperatures recited in the disclosed process, the term "approximately" means within plus or minus 10 percent (%) of the stated temperature value. It should be understood that the order of the method steps illustrated and described herein is not intended to be limiting. Unless otherwise noted, the steps of the method may be performed concurrently with one another or in a different sequence than that presented. It should also be understood that the process set forth herein may be performed along with or in addition to other method steps that are not described or illustrated without departing from the scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. These antecedent recitations should be interpreted to cover any combination in which the inventive novelty exercises its utility. Many modifications and variations of the present invention are possible in light of the above teachings and may be practiced otherwise than as specifically described while within the scope of the appended claims.

What is claimed is:

1. A method for producing an injection molded component having a metallic surface finish comprising the steps of:
heating a first material containing an engineering thermoplastic and glass fibers for reinforcement to a first temperature that is above a melting point of the first material;
injecting a first shot of the first material into a mold cavity at a first volumetric flowrate, the mold cavity defining a volume of the injection molded component and the first volumetric flowrate ranging from 33 percent of the volume of the injection molded component per second to 100 percent of the volume of the injection molded component per second;
holding a surface of the mold cavity at a second temperature that is below the melting point of the first material in order to cool the first material that was injected into the mold cavity and form a structural core of the injection molded component;

heating a second material containing the engineering thermoplastic and a milled material to a third temperature that is above a melting point of the second material;

injecting a second shot of the second material into the mold cavity between the surface of the mold cavity and the structural core at a second volumetric flowrate that is less than the first volumetric flowrate in order to avoid metameric failure caused by disrupting the distribution and orientation of the milled material in the second material, the second volumetric flowrate ranging from 5 percent of the volume of the injection molded component per second to 25 percent of the volume of the injection molded component per second;

holding the surface of the mold cavity at a fourth temperature that is greater than the second temperature and less than melting point of the second material in order to fuse the second material injected into the mold cavity with the first material of the structural core and form an outer layer around the structural core that is made of the second material and that has a uniform metallic surface finish provided by the milled material; and removing the injection molded component comprising the structural core and the outer layer from the mold cavity.

2. The method as set forth in claim 1 wherein said step of injecting the first shot includes injecting the first material into the mold cavity at a first pressure ranging from 8,000 pounds per square inch to 14,000 pounds per square inch and wherein said step of injecting the second shot includes injecting the second material into the mold cavity between the surface of the mold cavity and the structural core at a second pressure ranging from 3,500 pounds per square inch to 6,500 pounds per square inch.

3. The method as set forth in claim 1 wherein the first material is a glass reinforced polyoxymethylene and the second material is a pigmented polyoxymethylene.

4. The method as set forth in claim 1 wherein the first material is a glass reinforced polybutylene terephthalate and the second material is a pigmented polybutylene terephthalate.

5. The method as set forth in claim 1 wherein the second material does not contain glass fibers.

6. The method as set forth in claim 1 wherein the milled material is selected from a group consisting of: aluminum micro-flake and mica micro-flake.

7. The method as set forth in claim 1 wherein the volume of the first material injected into the mold cavity during said step of injecting the first shot is less than the volume of the mold cavity such that the outer layer that is formed by the second material has a nominal thickness ranging from 0.5 millimeters to 3 millimeters.

8. The method as set forth in claim 1 wherein the first temperature is approximately 400 degrees Fahrenheit and the third temperature is approximately 375 degrees Fahrenheit.

9. The method as set forth in claim 1 wherein the second temperature ranges from 55 degrees Fahrenheit to 180 degrees Fahrenheit.

10. The method as set forth in claim 1 wherein the fourth temperature ranges from 220 degrees Fahrenheit to 280 degrees Fahrenheit.

11. The method as set forth in claim 1 wherein the fourth temperature is approximately 245 degrees Fahrenheit.

* * * * *